US00RE46879E

(19) United States
(12) Reissued Patent
Daems et al.

(10) Patent Number: US RE46,879 E
(45) Date of Reissued Patent: May 29, 2018

(54) PROCESSING OF SATELLITE NAVIGATION SYSTEM SIGNALS AND RELATED RECEIVE-SIGNAL VERIFICATION

(71) Applicant: TELIT AUTOMOTIVE SOLUTIONS NV, Leuven (BE)

(72) Inventors: Frank C. H. Daems, Rotselaar (BE); Johan F. J. Peeters, Bierbeek (BE)

(73) Assignee: Telit Automotive Solutions NV, Leuven (BE)

(21) Appl. No.: 14/748,700

(22) Filed: Jun. 24, 2015

Related U.S. Patent Documents

Reissue of:
(64) Patent No.: 8,471,763
Issued: Jun. 25, 2013
Appl. No.: 12/665,046
PCT Filed: Jun. 24, 2008
PCT No.: PCT/IB2008/052504
§ 371 (c)(1),
(2) Date: Sep. 15, 2010
PCT Pub. No.: WO2009/001294
PCT Pub. Date: Dec. 31, 2008

(30) Foreign Application Priority Data

Jun. 26, 2008 (GB) ..... 0712376.3

(51) Int. Cl.
*G01S 19/21* (2010.01)
*G01S 19/09* (2010.01)
(Continued)

(52) U.S. Cl.
CPC ..... *G01S 19/09* (2013.01); *G07B 15/06* (2013.01)

(58) Field of Classification Search
CPC ..... G01S 19/21
See application file for complete search history.

(56) References Cited

U.S. PATENT DOCUMENTS 5,390,207 A * 2/1995 Fenton et al. ..... 342/357.61
5,663,734 A * 9/1997 Krasner ..... 342/357.64
(Continued)

FOREIGN PATENT DOCUMENTS

CN 1113486 C 7/2003
EP 0444738 A2 9/1991
(Continued)

OTHER PUBLICATIONS

L. Breems et al., Continuous-Time Sigma-Delta Modulation for A/D Conversion in Radio Receivers, Kluwer Academic Publishers, p. 1-27, 2001.*

(Continued)

*Primary Examiner* — Matthew C Graham
(74) *Attorney, Agent, or Firm* — Pearl Cohen Zedek Latzer Baratz LLP

(57) ABSTRACT

A system implements a location based service, and comprises a satellite navigation receiver implementing a position tracking function for providing the location of a user of the service. An analogue RF receiver receives satellite signals and performs at least a frequency downconversion. Correlation and decoding functions are applied to the downconverted signals for deriving location information from detected specific satellite signals. The system further comprises a server for receiving samples of the downconverted signals, and for verifying the samples are consistent with the expected satellite signals at that time and location. The invention provides a counter measure for detecting the counterfeiting of, or tampering with, the satellite signals at the receiver. A check can be made that the received satellite signals correspond to those which are expected at that location and time.

20 Claims, 5 Drawing Sheets

(51) Int. Cl.
*G01S 19/14* (2010.01)
*G07B 15/06* (2011.01)

(56) References Cited

U.S. PATENT DOCUMENTS

| | | | | |
|---|---|---|---|---|
| 5,734,962 | A | 3/1998 | Hladik et al. | |
| 5,959,577 | A | 9/1999 | Fan et al. | |
| 6,384,777 | B1 * | 5/2002 | McBurney et al. | 342/357.31 |
| 6,570,858 | B1 * | 5/2003 | Emmons et al. | 370/321 |
| 6,882,309 | B2 * | 4/2005 | Bromley et al. | 342/357.64 |
| 2004/0004570 | A1 * | 1/2004 | Townsend et al. | 342/384 |
| 2004/0202292 | A1 * | 10/2004 | Cook | 342/357.12 |
| 2005/0099334 | A1 * | 5/2005 | Roh | 342/357.12 |
| 2005/0104772 | A1 * | 5/2005 | Diggelen et al. | 342/357.02 |
| 2005/0131625 | A1 * | 6/2005 | Birger et al. | 701/117 |
| 2005/0270232 | A1 * | 12/2005 | Masuda | 342/357.02 |
| 2006/0023655 | A1 * | 2/2006 | Engel et al. | 370/328 |
| 2006/0235739 | A1 * | 10/2006 | Levis et al. | 705/9 |
| 2007/0225912 | A1 * | 9/2007 | Grush | 701/213 |
| 2008/0037687 | A1 * | 2/2008 | Li et al. | 375/316 |
| 2008/0300776 | A1 * | 12/2008 | Petrisor et al. | 701/118 |
| 2010/0205316 | A1 * | 8/2010 | Xue et al. | 709/229 |

FOREIGN PATENT DOCUMENTS

| | | | |
|---|---|---|---|
| EP | 1 050 853 | A1 | 11/2000 |
| EP | 1 734 379 | A1 | 12/2006 |
| EP | 1734379 | A1 * | 12/2006 |
| ES | 2239612 | T3 | 10/2005 |
| JP | 2003-217078 | A | 7/2003 |
| JP | 2006-284338 | A | 10/2006 |
| WO | 01/48507 | A1 | 7/2001 |
| WO | 02/01157 | A1 | 1/2002 |

OTHER PUBLICATIONS

International Search Report for Appln. PCT/IB2008/052504 (Dec. 1, 2008).

* cited by examiner

PROCESSING OF SATELLITE NAVIGATION SYSTEM SIGNALS AND RELATED RECEIVE-SIGNAL VERIFICATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This Application is a Reissue Application of U.S. Pat. No. 8,471,763, issued Jun. 25, 2013, which is a National Phase Application of PCT International Application No. PCT/IB2008/052504, entitled "PROCESSING OF SATELLITE NAVIGATION SYSTEM SIGNALS", International Filing Date Jun. 24, 2008, published on Dec. 31, 2008 as International Publication No. WO 2009/001294, which in turn claims priority from GB Patent Application No. 0712376.3, filed Jun. 26, 2007, all of which are incorporated herein by reference in their entirety.*

This invention relates to the processing of satellite navigation system signals, in systems providing a location based service.

There are a number of location based services, where the genuine location of a user needs to be known or tracked. One example is road toll systems, for implementing an automatic payment system for deducting road tolls based on the road sections used.

Vehicle telematics systems such as road tolling systems may be used for a number of other purposes, including managing road usage (intelligent transportation systems), tracking fleet vehicle locations, recovering stolen vehicles, providing automatic collision notification, location-driven driver information services and in-vehicle early warning notification alert systems (car accident prevention).

Road tolling is considered as the first likely large volume market for vehicle telematics. Telematics is now beginning to enter the consumer car environment as a multimedia service box for closed services. These markets are still low in volume and are considered as niche markets. The European union and with The Netherlands as a leading country has the intention to introduce road tolling as an obligatory function for every car from 2012 onwards.

So far, road tolling has been used for high way billing, truck billing and billing for driving a car in a certain area (e.g. London city). Toll plazas at which vehicles must stop are generally used, or else short range communications systems allow automatic debiting of a fund when a vehicle passes.

The road tolling functions needed in the near future will impose the requirement for less (or no) infrastructure and will impose tolling for every mile driven. It is envisaged that the vehicle will have a GPS system on board and a GSM (mobile telephony network) connection to enable information to be relayed to a centralized road tolling system.

The charging system in an automated road toll system can be based on distance travelled, the time, location and vehicle characteristics. The road tolling may apply to all vehicles or it may exclude certain classes of vehicle (for example with foreign number plates).

There is a need to increase the security of this type of system and to make fraudulent use of the system as difficult as possible. In particular, the integrity of the received GPS (or more generally GNSS) signal should be detectable.

Modern road pricing systems based upon GPS and GSM make use of the reception of the GPS satellite signals to determine the location, speed, etc. If the GNSS signals can be tampered, a user may be able to pretend to have driven on other (cheaper) roads. GPS test transmitters could conceivably be used for this purpose, with the test signals received by the On Board Unit (OBU).

The GNSS signals are decoded to NMEA (National Marine Electronics Association) format signals representing the decoded position.

Signal tampering can occur along the signal decoding path of the receiver, probing and inserting fake NMEA information. This type of attack can be prevented by applying tamper resistant and tamper proof techniques to the communication path between the GPS receiver and the application which processes the position data.

This invention is concerned specifically with preventing the generation of fake GPS (more generally GNSS) data, namely the raw data received by the GPS receiver front end.

In the GPS system, the satellite signals do not contain authentication data that allows the client to identify the integrity of the receiving signals. This makes the use of a fake GPS transmitter to generate false position data a realistic possibility. In practice, the cost saving in faking the journeys for an individual user is not likely to warrant the effort involved. However, equally important is the fact that people can claim that the system is not secure, thereby undermining the trustworthiness of the system.

According to the invention, there is provided a system implementing a location based service, comprising a mobile satellite navigation receiver implementing a position tracking function for providing the location of a user of the service, wherein the mobile receiver comprises:

an analogue rf receiver for receiving satellite signals and performing at least a frequency downconversion;

signal processing means for performing correlation functions to the downconverted signals for detecting specific satellite signals; and decoding means for deriving location information from the detected specific satellite signals, wherein the system further comprises means, for receiving samples of the downconverted signals from the mobile receiver, and for verifying the samples are consistent with the expected satellite signals at that time and location.

The invention provides a counter measure for detecting the counterfeiting of, or tampering with, the satellite signals at the receiver. The location information is determined from the processed downconverted signals, in normal manner. However, in addition, downconverted signals before the correlation processing are also provided to a server (hosted by the system administrator) and this enables a check to be made that the received satellite signals correspond to those which are expected at that location and time. The mobile receiver sends both raw data and decoded position data, and a correlation can be made between these.

Whilst it may be relatively straightforward to generate a fake satellite signal which, when processed, gives a desired location, it is not straightforward to generate a fake satellite signal which not only gives the desired location, but also is consistent with the satellite signals received at a particular time at that desired location.

The expected satellite signals can be derived from the determined location, time and the satellite positions at that time. In other words, the server can recreate the expected satellite signals by storing the ephemeris and almanac data, and using these with the location and time to derive the satellite signals.

In an alternative embodiment, the expected satellite signals are derived from an analysis of the downconverted signals from a plurality of users at the same time and in close proximity to each other. In this way, a form of cross correlation between users is implemented to detect a user that has satellite signals that do not match.

A timing generator can be provided for defining a time (for example using a random timestamp) at which the samples of downconverted signals for multiple users are provided to the server.

The system can comprise a road toll system, and the system then further comprises means for determining a road toll from the derived location information.

The invention also provides a method of determining the location of a user of a system which implements a location based service, the method comprising:

the user receiving satellite signals and performing at least a frequency downconversion in a mobile receiver;

the user providing the downconverted signals to signal processing means within the mobile receiver for performing correlation functions to the downconverted signals for detecting specific satellite signals and to decoding means for deriving location information from the detected specific satellite signals, wherein the method further comprising the user providing samples of the downconverted signals from the mobile receiver to the service provider, and wherein the method further comprises the service provider verifying the samples are consistent with the expected satellite signals at that time and location.

Examples of the invention will now be described in detail with reference to the accompanying drawings, in which.

Figure 1:
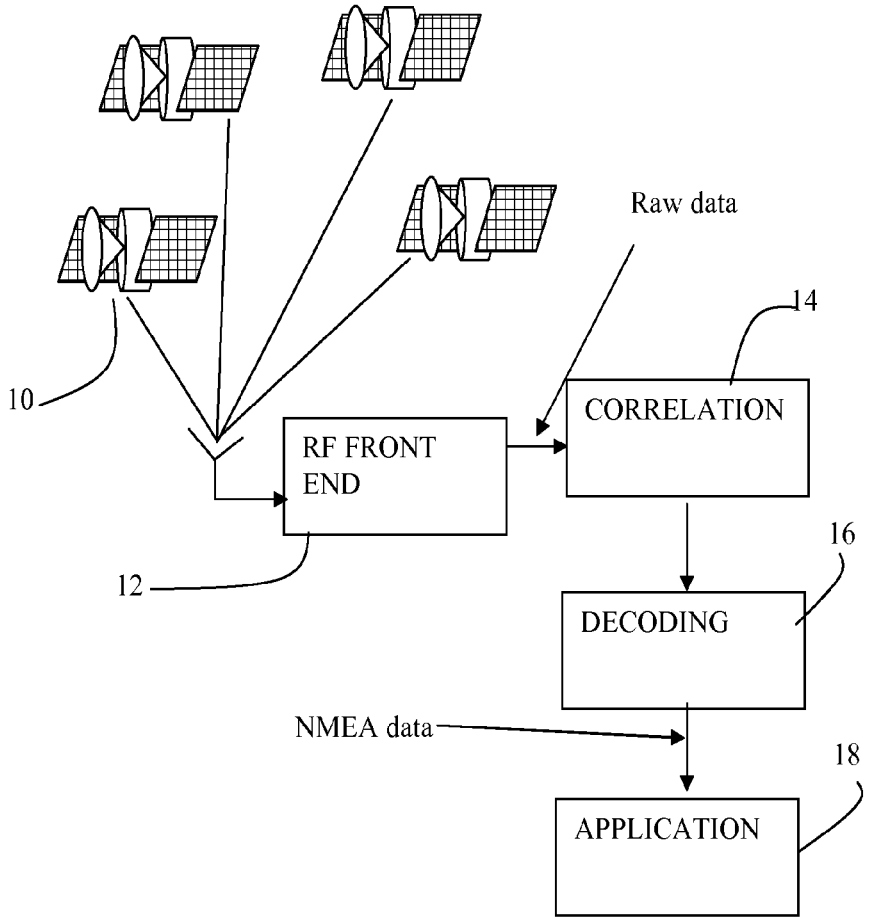
FIG. 1 shows the signals that are used in a known GPS system.

Before describing the invention in detail, a brief outline of the signals used within the GPS system will be given.

The global positioning system is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just under 24 hours.

Each satellite transmits on several frequencies. Civilian GPS receivers currently use the 'L1' frequency of 1575.42 MHz. The satellite orbits are roughly 25,000 kilometres from the earth's centre, or 20,000 kms above the earth's surface. The orbital paths of these satellites take them between roughly 60 degrees North and 60 degrees South latitudes.

The GPS signals transmitted by the satellites are of a form commonly known as Direct Sequence Spread Spectrum employing a pseudo-random code which is repeated continuously in a regular manner. The satellites broadcast several signals with different spreading codes including the Coarse/Acquisition or C/A code, which is freely available to the public, and the restricted Precise code, or P-code, usually reserved for military applications. The C/A code is a 1,023 bit long pseudo-random code broadcast with a chipping rate of 1.023 MHz, repeating every millisecond. Each satellite sends a distinct C/A code, which allows it to be uniquely identified.

A data message is modulated on top of the C/A code by each satellite and contains important information such as detailed orbital parameters of the transmitting satellite (called ephemeris), information on errors in the satellite's clock, status of the satellite (healthy or unhealthy), current date, and time. This part of the signal is essential to a GPS receiver determining an accurate position. Each satellite only transmits ephemeris and detailed clock correction parameters for itself and therefore an unaided GPS receiver must process the appropriate parts of the data message of each satellite it wants to use in a position calculation.

The data message also contains the so called almanac, which comprises less accurate information about all the other satellites and is updated less frequently. The almanac data allows a GPS receiver to estimate where each GPS satellite should be at any time throughout the day so that the receiver can choose which satellites to search for more efficiently. Each satellite transmits almanac data showing the orbital information for every satellite in the system.

A conventional GPS receiver reads the transmitted data message and saves the ephemeris, almanac and other data for continual use. This information can also be used to set (or correct) the clock within the GPS receiver.

To determine position, the GPS receiver compares the time a signal was transmitted by a satellite with the time it was received by the GPS receiver. The time difference tells the GPS receiver how far away that particular satellite is. By combining distance measurements from multiple satellites, position can be obtained by trilateration. With a minimum of three satellites, a GPS receiver can determine a latitude/longitude position (a 2D position fix). With four or more satellites, a GPS receiver can determine a 3D position which includes latitude, longitude, and altitude.

By processing the apparent Doppler shifts of the signals from the satellites, a GPS receiver can also accurately provide speed and direction of travel (referred to as 'ground speed' and 'ground track').

A complete data signal from the satellites consists of a 37,500 bit Navigation Message, which takes 12.5 minutes to send at 50 bps. The data signal is divided into 25 30 s frames, each having 1500 bits, and these are divided into five 6 s subframes. Each 6 s subframe is divided into ten 30 bit words. All the information necessary for a position fix (ephemeris etc) is contained within each frame and so a GPS receiver will typically take around 30 s to produce a position fix from a so-called cold start.

The first word of each 6 s subframe contains a preamble to enable receivers to recognise the start of the subframe. The next word is the handover word which gives timing information since the last restart of GPS time (which takes place every Saturday/Sunday at midnight). The remaining 8 words provide the ephemeris, almanac and clock information, depending on the subframe.

The first subframe gives clock correction data, the second and third subframes give ephemeris data and the almanac data is in the fourth and fifth subframes.

The SVs all broadcast on the same frequency. In order to distinguish a signal from a particular satellite, the receiver needs to generate a replica of the C/A code known to be in use by that satellite and align it so that it is synchronised with the incoming signal which will be delayed by an unknown amount predominantly due to the time of flight of the signal in travelling from the satellite to the receiver (typically around 0.07 s). In general it is not possible for a receiver to accurately predict the alignment necessary to get the replica in sync with the incoming signal, so some form of search is required, with a number of alignments being tried in turn and the best match being selected. This process of evaluating a number of candidate alignments is normally termed correlation as the receiver implements a correlation function between the received signal and the known C/A code for each satellite in turn, to determine if the received signal includes a component having the C/A code from a particular SV. The correlation function has to be calculated for multiple relative timings, and when the correlation peak is found, this corresponds to a particular timing and a particular SV. The discovered timing in turn corresponds to a particular distance from the SV.

The determined code phase, i.e. the timing of the peak of the correlation function, reveals the accurate timing information for use in the distance calculation. However, as the code is repeated every millisecond, the coarse timing also needs to be determined. Typically, less frequently repeating data components are used for the more coarse timing evaluation (i.e. to enable GPS time to be derived), such as the individual bits of the 50 bps data message and specific parts of it such as the subframe preamble or subframe handover word.

Nearly all current and historical GPS receivers work by processing signals from the satellites in "real time", as they come in, reporting the position of the device at the current time. Techniques associated with such conventional receivers are well known.

Such "conventional" GPS receivers invariably comprise:

an antenna suitable for receiving the GPS signals, analogue RF circuitry (often called a GPS front end) designed to amplify, filter, and mix down to an intermediate frequency (IF) the desired signals so they can be passed through an appropriate analogue-to-digital (A/D) converter at a sample rate normally of the order of a few MHz, digital signal processing hardware that carries out the correlation process on the IF data samples generated by the ND converter, normally combined with some form of micro controller that carries out the "higher level" processing necessary to control the signal processing hardware and calculate the desired position fixes.

FIG. 1 shows the nature of the signals in a GPS system. The signals from the SVs 10 are received by a receiver RF front end 12, the output of which is a noisy signal that contains all data, dependent on the momentary location of the satellites, related to the place of reception and the time of reception.

This signal is referred to below as the 'raw data' signal, as shown in FIG. 1. As outlined above, this signal is a down-converted and analogue filtered signal, but which has undergone no signal processing. The data may be analogue data having had no ND conversion, or it may be digital data if the front end includes the A/D conversion. Typically, this signal is fed into the correlation block 14 and decoding block 16. The output of this processing typically generates the NMEA data, indicating e.g. longitude and latitude of the receiving position. In a continuously processing system, the NMEA data is continuously derived from the received raw data and is then processed by the application block 18 which implements the road tolling function.

The application can not verify the integrity of the data, due to lack of authentication possibility of the raw data.

When the receiving location does not change, the same NMEA data will be generated, but derived from different raw data which varies over time along with the movement of the GNSS satellites over the orbits.

The invention provides a system which aims to recognise if the decoded data (the NMEA data) was processed on the basis of real GPS received signals instead of fake signals, such as test transmitter signals.

Figure 2:
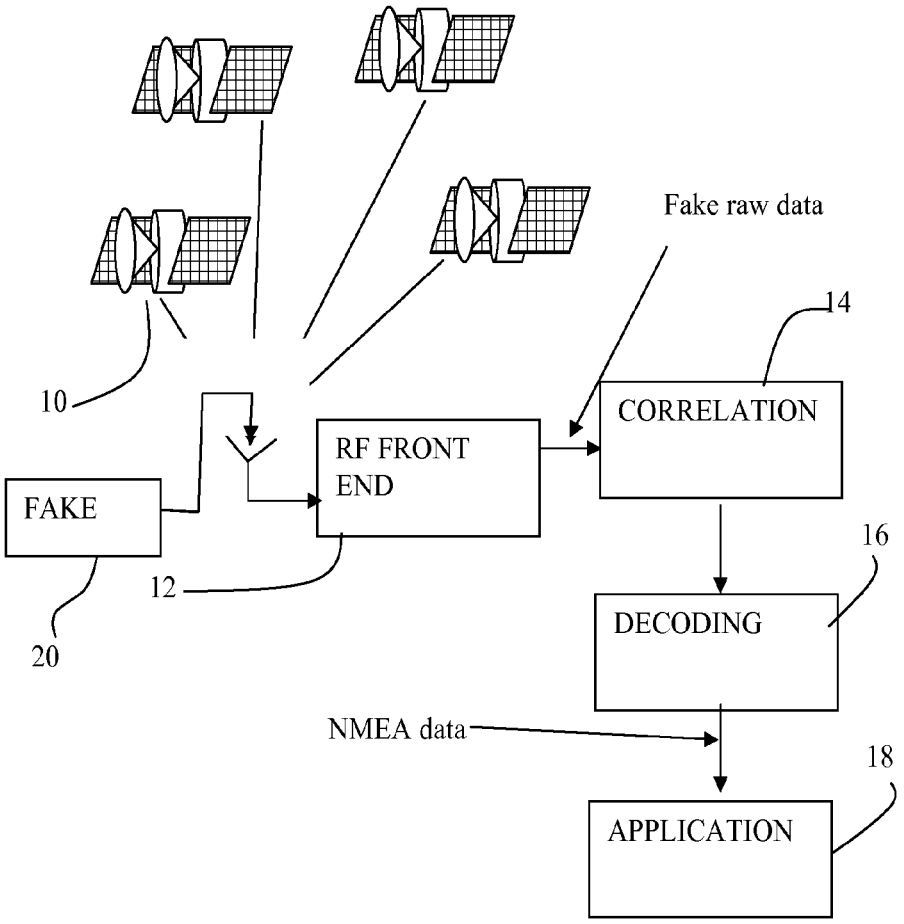
FIG. 2 shows how a fake GPS transmitter can be used to derive false position information.

FIG. 2 shows how a test transmitter 20 can be used to feed data to the front end, resulting in "Fake raw data", and which in turn gives rise to "Fake NMEA data", for example data for a toll free road. An attack thus occurs by faking the GPS input.

Figure 3:
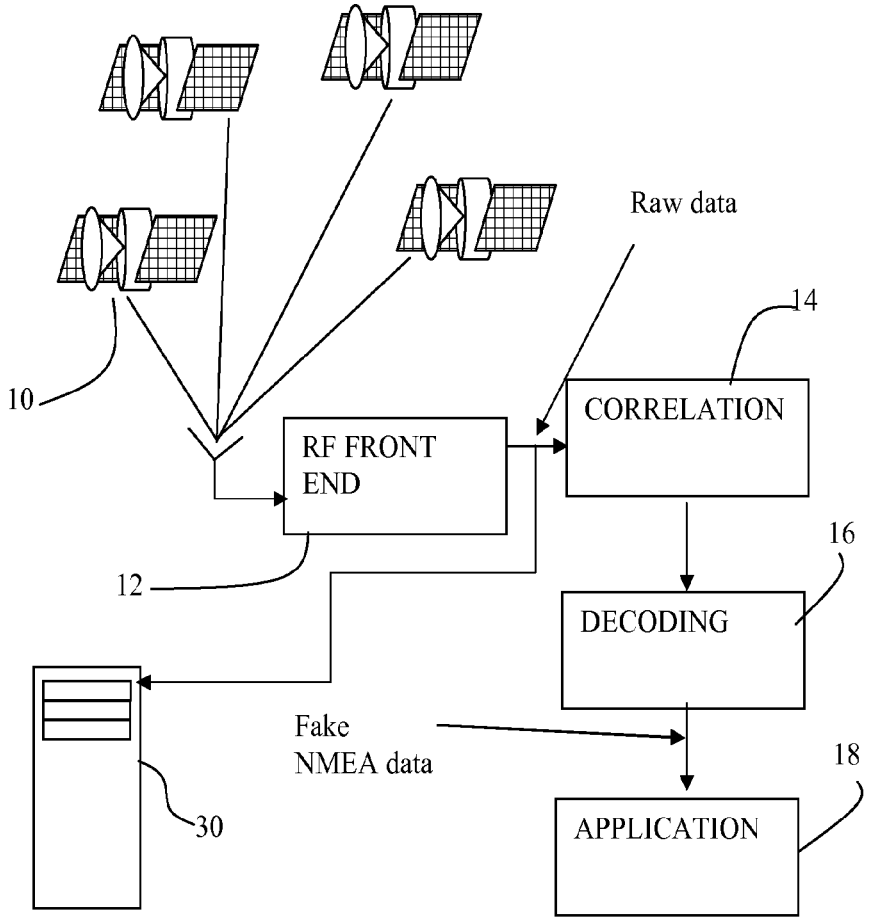
FIG. 3 shows a first example of system of the invention.

FIG. 3 shows an example of system of the invention.

A server 30 is provided which has to be provided with the raw data at periodic intervals. This checks the raw data based on the known satellite locations at the particular time, and for the known position (i.e. the position given when the data is decoded). The (alleged) position is known from the NMEA data derived from those samples and from the other samples at approximately the same time.

Thus, at particular times, the raw data is not directly processed by the correlation and decoder block, but is forwarded as a sample to the receiving server 30. This server knows the time and orbital position of the GNSS satellites. It can thus decode the raw data to derive NMEA information, but can also test if the raw data matches with the expected raw data to be generated by the particular GNSS satellites at that time and place of reception.

Thus a verification is carried out between the raw samples and the location information derived by the decoding means at a very close time (e.g. the previously decoded position information, or a set of recent decoded positions, possibly taking into account velocity).

Of course, the server-calculated NMEA data should also match the sequence of received data in time and position, so that the stream of data provides a plausible road route.

This approach prevents fake NMEA data being inserted into the data stream, because the NMEA data calculated by the server from the raw data will then not match the NMEA data provided by the receiver.

This approach also prevents fake raw data being inserted into the data stream. Even if the NMEA data does match, the received raw data can be detected as different to the server-calculated raw data to provide a proof of tampering.

In this system, the only way to successfully falsify the data is to provide raw data to the receiver which not only corresponds to the desired fake NMEA data (giving a fake toll-free location) but also is consistent with the raw data which would be received at that fake location at that particular time. This provides an enormously more complicated challenge. In particular, the task of verifying that the raw data is consistent with the raw data signals to be expected at a particular location at a particular time (which is what has to be done by the server) is computationally far simpler that the task of generating raw data which is expected at a particular time and location.

To increase the integrity of the system, the system can be expanded with a random element, generating a particular random time stamp at which the client is asked to take a raw data sample out of the air.

Figure 4:
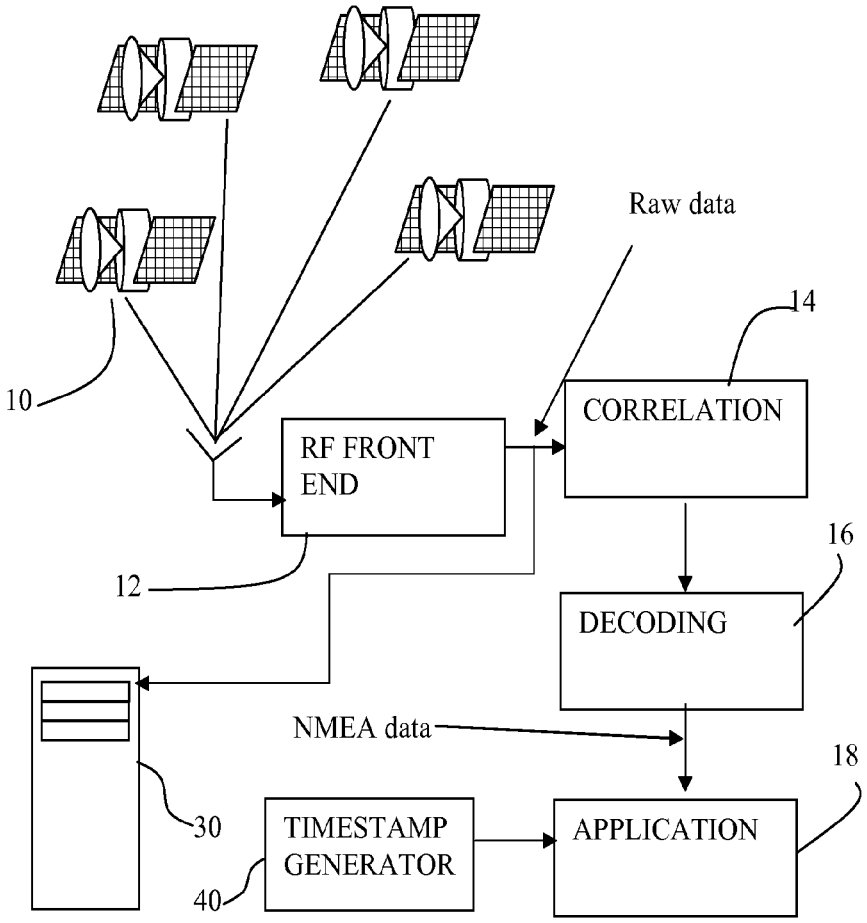
FIG. 4 shows a second example of system of the invention.

This system is shown in FIG. 4, and includes a random time stamp generator 40. By working on a random sample basis, the system can be implemented with low cost, even if it is applied in large scale volumes, as would be the case in a road pricing system.

The timestamp generator can be part of the server, and this ensures that the timestamps are the same for all clients, which is required when a comparison of the raw data from multiple clients is to be carried out, as explained above.

The system described above requires a server to verify that the raw data corresponds to that expected from a particular location at a given time. This requires significant computational effort in the server.

A modification can use relative data in order to avoid this calculation but still provide tamper evidence results. The modification requires systems serving many clients, such as a road pricing system.

In this modified system, the server again determines a time stamp and this is sent to a large number of clients (users). The target group can be based upon stochastic analysis of data previously obtained from the system. These clients are all requested to take a snapshot of received raw data at the given time stamp AND when the calculated NMEA result is in a certain range also previously communicated by the server. Thus, the users in a particular location are requested to send raw data at the same time. The responding clients forward their result to the server.

Correlation of the raw data from the various clients with each other at the server side can reveal the fraud occurring at one of the responding clients. This fraud detection may also be based on data other than the raw data. For example, the clients can be selected based on their position derived through other means, such as e.g. GSM-based location or the use of roadside beacons. In this case, the reported coordinates will also reveal the fraud, and raw data is not necessary.

Figure 5:
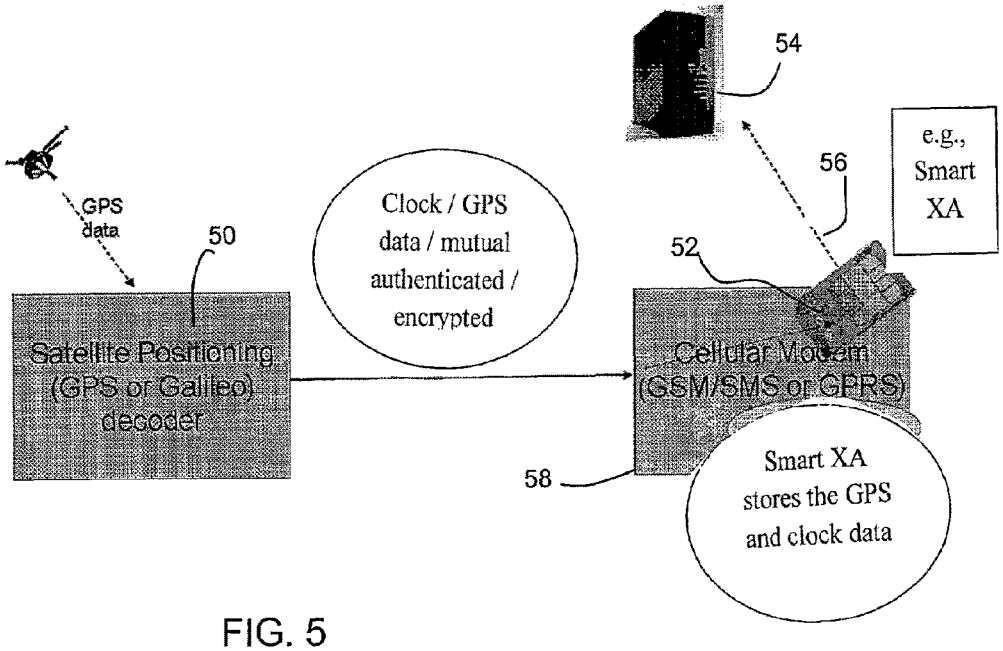
FIG. 5 shows a first example of road toll system which can use the system of the invention.

FIG. 5 shows a road toll system to which the invention can be applied, based on an off-line minimal client system for infrastructure-less road tolling.

GPS data is captured by the GPS receiver 50. This data is decoded to position data (longitude-latitude). The position data together with timing (clock) data is stored in memory 52 in the form of a Smart card (Smart XA). Periodically a batch of stored data is sent to the back-end road tolling server 54, as shown by the batch download 56. This can be ideally done by a GSM function (General Packet Radio Service "GPRS" or Third Generation mobile telephony "3G") using a cellular modem 58. The back-end server is able to reconstruct out of this data the journeys that are driven.

The additional raw data samples are also provided, in accordance with the invention, as part of the data stream 56.

The server also contains a database of road prices which were valid at a certain time. Finally the total price is computed and the driver gets an invoice (e.g. monthly).

Data is exchanged in cryptographic way (e.g. DES or 3DES) between the GPS decoder and the tamper resistant environment of the memory 52. A Smart card provides a good tamper proof environment.

If the total income from road tolling is to be approximately the same as the actual tax income from existing taxation, the average cost/km is very small. Each journey is thus very small, which means a continuous on-line transaction scheme may not be desirable, hence the desire for a batch download.

This type of transaction scheme is much in line with current known electronic purse schemes used by the banking world.

Figure 6:
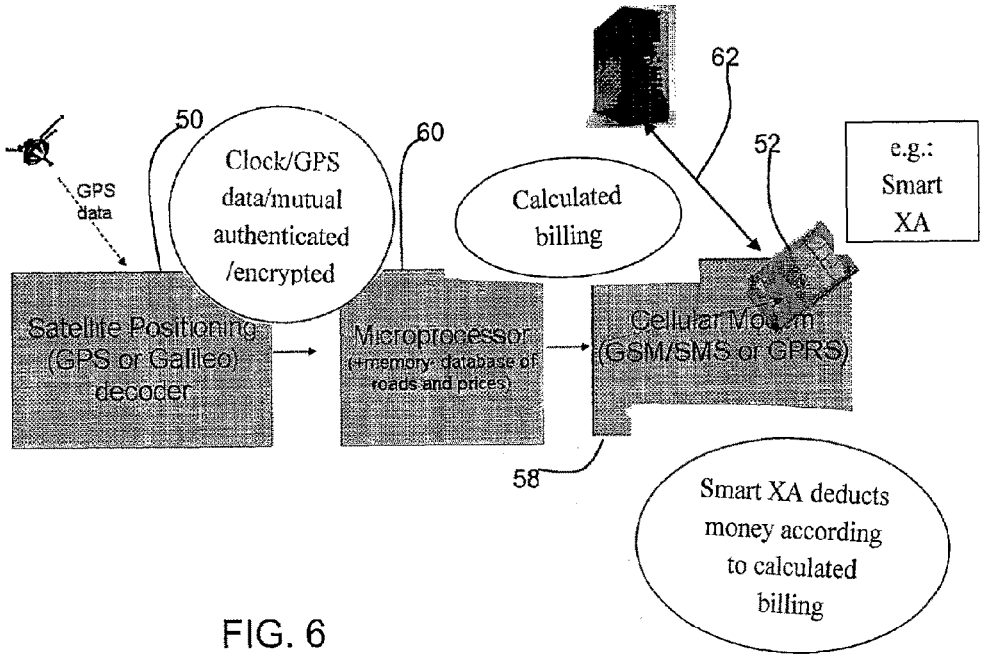
FIG. 6 shows a first example of road toll system which can use the system of the invention.

A prepayment system is shown in FIG. 6. The GPS data is again captured by the GPS receiver 50. This data is decoded to position data (longitude-latitude). The position data together with timing (clock) data is sent to a microprocessor 60.

The microprocessor environment contains the database of roads and related prices. Thus, it can calculate the related cost of actual driving. This cost data is deducted from the prepay amount stored in the Smart card 52.

The data update of prices and roads is uploaded from the back-end server 54 transmitted over GSM (GPRS-3G) as shown by upload 62.

Data again is exchanged in cryptographic way (e.g. DES or 3DES) between the various elements. Databases and pre-pay information are kept in the Smart card environment.

The raw data samples are again provided to the server, so that the communication between the server and the memory is two-way, as shown by arrow 62.

The smart card environment can also take up the role of deducting the amounts, or even performing the full microprocessor function. This is the ideal tamper resistant implementation.

This implementation requires the road and pricing data to be stored locally, but a complete database of roads and prices is not needed. In most cases, the car drives in a certain area (less than 50 or 100 km radius). This means that only a limited amount of road data has to be stored and updated. Eventually only frequently used roads can be stored.

The invention thus adds a layer of significant complexity if fake signals are attempted to be used to generate false position information.

The detailed example above relates to road tolling applications. However, it will be apparent that the system can be used to provide an additional layer of verification for all GPS decoding systems, and is not limited to vehicle systems. Any system which has charging or service provision as a function of location can benefit from the additional security provided by this invention.

The invention has been described in connection with single frequency GPS, but other GNSS systems (GLONASS, Galileo etc) would be similar. Indeed the techniques could also be applied to multiple frequency systems, with appropriate means of capturing the IF data from each carrier.

The server in the system needs to be able to verify that raw data is consistent with the (alleged) location and time. A database can be used to record every data bit every GPS SV has transmitted for the last week (32SV*50 bps*24 hrs*60 mins*60 s=~17 Mbytes per day). Thus, storing all the SV data is feasible, even for a prolonged period of time, and this can be used to provide the verification that the raw data is consistent with the alleged location at a particular time.

The raw data samples may be analogue or digital. They will be at an intermediate frequency (IF), and have been analogue filtered. However, they will not have been processed to derive the individual SV data streams, and thus will not have been CDMA-demodulated.

The system described above has real time processing of satellite data. The less well known concept of "Store and Process Later" has also been investigated. This involves storing the IF data samples collected by a conventional antenna and analogue RF circuitry in some form of memory before processing them at some later time (seconds, minutes, hours or even days) and often at some other location, where processing resources are greater.

The key advantages of the Store and Process Later approach over conventional GPS receivers are that the cost and power consumption of the capturing device are kept to a minimum as no digital signal processing needs be done at the time of capture, and the grabs can be very short (e.g. 100 ms). If the subsequent signal processing is done when the relevant satellite data (ephemeris etc) can be obtained via some other method, this approach also removes the need to decode the (very slow) data message from the SVs in the capturing device, which in many cases leads to unacceptably long times to start up conventional devices.

For example, a number of small capture devices which store short "grabs" of IF data samples into memory can subsequently upload their IF data grabs to a shared central computer which would not only carry out the necessary signal processing (correlation etc), but would also have access to a database of recent satellite information (ephemeris etc) by being connected to one or more conventional GPS receivers which relayed key parts of the GPS data message they received to the central computer.

This invention can also be applied to a store and process later approach, again by providing a check that the stored raw data samples and their time and (alleged) position match the expected signals received at that time and position. The invention is conceptually the same, but there is a time delay in processing the data, and the position determination is then performed remotely from the satellite signal receiver.

One approach of the invention is to provides a correlation between decoded position information from a mobile receiver and raw downconverted data samples taken at the same or approximately the same time. Another approach is to provides a correlation between raw downconverted data samples of multiple receivers which all are (allegedly) at approximately the same location. In either case, there is verification that raw samples are consistent with the expected satellite signals at that time and location.

Various modifications will be apparent to those skilled in the art.

The invention claimed is:

1. A [system implementing a location based service, comprising: a] mobile satellite navigation receiver implementing a position tracking function for providing a location of a user *device* of [the] *a location based* service, [wherein] the mobile satellite navigation receiver [includes] *comprising*:

an analogue RF receiver for receiving satellite signals and performing at least a frequency downconversion;

a first signal processing circuit for performing correlation functions to the downconverted signals for detecting specific satellite signals; and a decoder for deriving location information from the detected specific satellite signals[; and], *wherein the mobile satellite navigation receiver provides samples of the downconverted signals to* a second signal processing circuit for [receiving samples of the downconverted signals from the mobile satellite navigation receiver and] verifying that the samples are consistent with signals expected for the time and location at which the specific satellite signals are detected, wherein the expected satellite signals are derived from, or correspond to signals representing, an analysis of the downconverted signals from a plurality of [users] *user devices* at the same time and in close proximity to each other.

2. A system as claimed in claim 1, further comprising *receiving a request from* a timing generator [for] defining a time at which the samples of *the* downconverted signals for multiple users are provided to a server.

3. A system as claimed in claim 2, wherein the timing generator generates a random timestamp.

4. A method of determining a location of a user device of a system which implements a location based service, the method comprising:

the user device receiving satellite signals and performing at least a frequency downconversion in a mobile receiver;

the user device providing the downconverted signals to signal processing circuitry within the mobile receiver for performing correlation functions to the downconverted signals for detecting specific satellite signals and to decoding circuitry for deriving location information from the detected specific satellite signals, the user device providing samples of the downconverted signals from the mobile receiver to a service provider, [and] *wherein the samples of the downconverted signals are provided for* the service provider [verifying] *to verify that* the samples are consistent with satellite signals expected for the time and location at which the specific satellite signals are detected, wherein the expected satellite signals are derived from an analysis of the downconverted signals from a plurality of user devices at the same time and in close proximity to each other.

5. A method as claimed in claim 4, further comprising *receiving a request* defining a time at which the samples of downconverted signals for multiple users are provided to a server.

6. A method as claimed in claim 5, wherein defining a time comprises generating a random timestamp.

7. A system for implementing a location based service, the system comprising:

[a mobile satellite navigation receiver implementing a position tracking function for providing a location of a user of the service, wherein the mobile satellite navigation receiver includes:

an analogue RF receiver for receiving satellite signals and performing at least a frequency downconversion;

a signal processor that performs correlation functions to the downconverted signals for detecting specific satellite signals; and a decoder that derives location information from the detected specific satellite signals; and]

a receiver that obtains samples of [the] downconverted signals from [the] *a* mobile satellite navigation receiver, *wherein the downconverted signals are generated by the mobile satellite navigation receiver performing at least a frequency downconversion of satellite signals received by an analogue RF receiver,* and verifies that the samples are consistent [with-signals] *with signals* expected for the time and location at which the specific satellite signals are detected, wherein the expected satellite signals are derived from an analysis of the downconverted signals from a plurality of [users] *user devices* at the same time and in close proximity to each other.

8. A system as claimed in claim 7, further comprising a timing generator for defining a time at which the samples of downconverted signals for multiple [users] *user devices* are provided to a server.

9. A system as claimed in claim 8, wherein the timing generator generates a random timestamp.

10. A method of determining a location of a user *device* of a system which implements a location based service, the method comprising:

*a service provider obtaining samples of downconverted signals provided by* the user [receiving satellite signals and] *device, wherein the downconverted signals are generated by a mobile receiver* performing at least a frequency downconversion [in a mobile receiver; the user providing] *of received satellite signals, wherein* the downconverted signals [to] *are obtained by* a signal processor within the mobile receiver for performing correlation functions to the downconverted signals for detecting specific satellite signals and to a decoder that derives location information from the detected specific satellite signals,

[the user providing samples of the downconverted signals from the mobile receiver to a service provider,] and the service provider verifying the samples are consistent with satellite signals expected for the time and location at which the specific satellite signals are detected by defining a time, which includes generating a random timestamp, at which the samples of downconverted signals are provided to the service provider.

11. A method as claimed in claim 10, wherein the expected satellite signals are derived from the determined location, time and the satellite positions at said time.

12. A method of determining a location of a user *device* of a system which implements a location based service, the method comprising:

*a service provider obtaining samples of downconverted signals provided by* the user [receiving satellite signals and] *device, wherein the downconverted signals are generated by a mobile receiver* performing at least a frequency downconversion [in a mobile receiver; the user providing] *of received satellite signals wherein* the downconverted signals [to] *are obtained by* a signal processor within the mobile receiver for performing correlation functions to the downconverted signals for detecting specific satellite signals and to a decoder that derives location information from the detected specific satellite signals,

[the user providing samples of the downconverted signals from the mobile receiver to a service provider,] and the service provider verifying the samples are consistent with satellite signals expected for the time and location at which the specific satellite signals are detected, wherein the expected satellite signals are derived from an analysis of the downconverted signals from a plurality of [users] *user devices* at the same time and in close proximity to each other.

13. A method as claimed in claim 12, further comprising defining a time at which the samples of downconverted signals for multiple [users] *user devices* are provided to a server.

14. A method as claimed in claim 13, wherein defining a time comprises generating a random timestamp.

15. [A system implementing a location based service, comprising:

a mobile satellite navigation receiver implementing a position tracking function for providing a location of a user of the service, wherein the mobile satellite navigation receiver includes:

an analogue RF receiver for receiving satellite signals and performing at least a frequency downconversion;

a first signal processing circuit for performing correlation functions to the downconverted signals for detecting specific satellite signals; and a decoder for deriving location information from the detected specific satellite signals; and a second signal processing circuit for receiving samples of the downconverted signals from the mobile satellite navigation receiver and verifying that the samples are consistent with signals expected for the time and location at which the specific satellite signals are detected,] *The system of claim 1,* wherein the second signal processing circuit verifies that that the samples are consistent with the expected signals based on the previously decoded location information.

16. [A system implementing a location based service, comprising:

a mobile satellite navigation receiver implementing a position tracking function for providing a location of a user of the service, wherein the mobile satellite navigation receiver includes:

an analogue RF receiver for receiving satellite signals and performing at least a frequency downconversion;

a first signal processing circuit for performing correlation functions to the downconverted signals for detecting specific satellite signals; and a decoder for deriving location information from the detected specific satellite signals; and a second signal processing circuit for receiving samples of the downconverted signals from the mobile satellite navigation receiver and verifying that the samples are consistent with signals expected for the time and location at which the specific satellite signals are detected, wherein the second signal processing circuit] *The system of claim 7, wherein the receiver* verifies that that the samples are consistent with the expected signals based on [a set of previously decoded positions] *position information derived by the mobile satellite navigation receiver based on performing correlation functions to the downconverted signals for detecting specific satellite signals and deriving the position information from the detected specific satellite signals*.

17. [A method of determining a location of a user of a system which implements a location based service, the method comprising:

the user receiving satellite signals and performing at least a frequency downconversion in a mobile receiver;

the user providing the downconverted signals to signal processing circuitry within the mobile receiver for performing correlation functions to the downconverted signals for detecting specific satellite signals and to decoding circuitry for deriving location information from the detected specific satellite signals, the user providing samples of the downconverted signals from the mobile receiver to a service provider, and the service provider verifying the samples are consistent with satellite signals expected for the time and location at which the specific satellite signals are detected,] *The method of claim 4,* wherein verifying the samples are consistent with the expected signals is based on the previously decoded location information.

18. [A method of determining a location of a user of a system which implements a location based service, the method comprising:

the user receiving satellite signals and performing at least a frequency downconversion in a mobile receiver;

the user providing the downconverted signals to signal processing circuitry within the mobile receiver for performing correlation functions to the downconverted signals for detecting specific satellite signals and to decoding circuitry for deriving location information from the detected specific satellite signals, the user providing samples of the downconverted signals from the mobile receiver to a service provider, and the service provider verifying the samples are consistent with satellite signals expected for the time and location at which the specific satellite signals are detected,] *The method of claim 12,* wherein verifying the samples are consistent with the expected signals is based on [a set of previously decoded positions] *location information derived by the mobile receiver based on performing correlation functions to the downconverted signals for detecting specific satellite signals and deriving the position information from the detected specific satellite signals*.

[19. A system for implementing a location based service, the system comprising:

a mobile satellite navigation receiver implementing a position tracking function for providing a location of a user of the service, wherein the mobile satellite navigation receiver includes:

an analogue RF receiver for receiving satellite signals and performing at least a frequency downconversion;

a signal processor that performs correlation functions to the downconverted signals for detecting specific satellite signals; and a decoder that derives location information from the detected specific satellite signals; and a receiver that obtains samples of the downconverted signals from the mobile satellite navigation receiver, and verifies that the samples are consistent with-signals expected for the time and location at which the specific satellite signals are detected, wherein the second signal processing circuit verifies that that the samples are consistent with the expected signals based on the previously decoded location information.]

20. [A system for implementing a location based service, the system comprising:

a mobile satellite navigation receiver implementing a position tracking function for providing a location of a user of the service, wherein the mobile satellite navigation receiver includes:

an analogue RF receiver for receiving satellite signals and performing at least a frequency downconversion;

a signal processor that performs correlation functions to the downconverted signals for detecting specific satellite signals; and a decoder that derives location information from the detected specific satellite signals; and a receiver that obtains samples of the downconverted signals from the mobile satellite navigation receiver, and verifies that the samples are consistent with-signals expected for the time and location at which the specific satellite signals are detected,] *The system of claim 1,* wherein the second signal processing circuit verifies that that the samples are consistent with the expected signals based on a set of previously decoded positions.

[21. A method of determining a location of a user of a system which implements a location based service, the method comprising:

the user receiving satellite signals and performing at least a frequency downconversion in a mobile receiver;

the user providing the downconverted signals to a signal processor within the mobile receiver for performing correlation functions to the downconverted signals for detecting specific satellite signals and to a decoder that derives location information from the detected specific satellite signals, the user providing samples of the downconverted signals from the mobile receiver to a service provider, and the service provider verifying the samples are consistent with satellite signals expected for the time and location at which the specific satellite signals are detected, wherein verifying the samples are consistent with the expected signals is based on the previously decoded location information.]

22. [A method of determining a location of a user of a system which implements a location based service, the method comprising:

the user receiving satellite signals and performing at least a frequency downconversion in a mobile receiver;

the user providing the downconverted signals to a signal processor within the mobile receiver for performing correlation functions to the downconverted signals for detecting specific satellite signals and to a decoder that derives location information from the detected specific satellite signals, the user providing samples of the downconverted signals from the mobile receiver to a service provider, and the service provider verifying the samples are consistent with satellite signals expected for the time and location at which the specific satellite signals are detected,] *The method of claim 4,* wherein verifying the samples are consistent with the expected signals is based on a set of previously decoded positions.

* * * * *